US008682710B2

(12) United States Patent
Dennard et al.

(10) Patent No.: US 8,682,710 B2
(45) Date of Patent: Mar. 25, 2014

(54) SYSTEM AND METHOD TO MODEL AND FORECAST TECHNOLOGY ADOPTION

(75) Inventors: Mark D. Dennard, Decatur, GA (US); James R. Rudd, Charlotte, NC (US); Robert J. Torres, Colleyville, TX (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/629,504

(22) Filed: Dec. 2, 2009

(65) Prior Publication Data
US 2011/0131078 A1    Jun. 2, 2011

(51) Int. Cl.
*G06Q 10/00*    (2012.01)
*G06Q 30/00*    (2012.01)
*G06T 11/20*    (2006.01)

(52) U.S. Cl.
USPC ....... 705/7.31; 705/7.11; 705/7.29; 705/7.32; 705/7.36; 705/7.37; 345/440

(58) Field of Classification Search
USPC .............................................. 705/7.11–7.42
See application file for complete search history.

(56) References Cited

U.S. PATENT DOCUMENTS

| | | | |
|---|---|---|---|
| 6,591,232 B1 * | 7/2003 | Kassapoglou | 703/2 |
| 7,415,434 B2 * | 8/2008 | Adduci et al. | 705/36 R |
| 2003/0182215 A1 * | 9/2003 | Ringler et al. | 705/35 |
| 2004/0122686 A1 * | 6/2004 | Hill et al. | 705/1 |
| 2004/0249700 A1 | 12/2004 | Gross | |
| 2004/0260600 A1 | 12/2004 | Gross | |
| 2004/0267604 A1 | 12/2004 | Gross | |
| 2005/0288993 A1 | 12/2005 | Weng et al. | |
| 2007/0294128 A1 | 12/2007 | Wedemeyer | |
| 2008/0065517 A1 * | 3/2008 | Aerdts | 705/28 |
| 2008/0154695 A1 * | 6/2008 | Wolfe et al. | 705/10 |
| 2009/0119139 A2 * | 5/2009 | Veeningen et al. | 705/7 |
| 2010/0073373 A1 * | 3/2010 | Groff et al. | 345/440 |

OTHER PUBLICATIONS

Thomas Berger "Agent-based Spatial Models Applied to Agriculture: A Simulation Tool for Technology Diffusion, Resource Use Changes and Policy Analysis" Agriculture Economics 25 (2/3), pp. 245-260 (2001).*
Yeong-Wha Sawng et al. "Market analysis for the next-generation mobile communications (DMB) service from the perspective of innovation adoption and diffusion" (Aug. 2005).*
http://theintegratedlab.com/2009/04/the-technology-adoption-s-curve-and-the-assimilation-gap/.*

* cited by examiner

*Primary Examiner* — Jason Dunham
*Assistant Examiner* — Richard Scheunemann
(74) *Attorney, Agent, or Firm* — Matthew Chung; Roberts Mlotkowski Safran Cole, P.C.

(57) ABSTRACT

A method is implemented in a computer infrastructure having computer executable code tangibly embodied on a computer readable storage medium having programming instructions. The programming instructions are operable to at least one of receive and assess current technology adoption trends. Additionally, the programming instructions are operable to provide a technology adoption forecast.

17 Claims, 10 Drawing Sheets

SYSTEM AND METHOD TO MODEL AND FORECAST TECHNOLOGY ADOPTION

FIELD OF THE INVENTION

The present invention generally relates to technology adoption, and more particularly, to a method and system to model and forecast technology adoption.

BACKGROUND

Technology is a driving force in commerce and business. For example, technology influences content and document management, e-commerce, as well as the general dissemination of information to the masses, to name a few. Technology is also at the cutting edge of new paradigms such as, for example, Internet based advertising and business and social collaboration. In the latter case, Web 2.0 applications have been developed which attempt to enhance creativity, information sharing, and, most notably, collaboration among users. Also, the evolving view of Web 2.0 combines a mixture of portability, collaboration, and technology to improve the user experience. These Web 2.0 applications have led to the evolution of web-based communities such as, for example, social networking sites, wikis and blogs.

As the Internet and other technologies evolve and become an ever more important tool for businesses to increase revenue and reduce costs, many businesses have begun to more seriously assess their use of such technologies. For example, in today's marketplace, retailers and other businesses are looking for ways to increase customer satisfaction, decrease operating cost, and develop a sense of trust between the consumer and the retailer using such technologies. To this end, businesses are developing new models that allow their customers, suppliers, etc., to not only collaborate with the business but also with each other. For example, content and opportunities for collaboration are being provided over managed forums such as, for example, wiki's, blogs, RSS, and folksonomies. Businesses are also able to deliver rich content to users enhancing their experience through AJAX and flex while moving to portable platforms.

In general, technology adoption follows a standard bell curve with a minority of businesses embracing technology in its earlier stages while another minority only reluctantly embrace such technology when it is mature. Said otherwise, a minority of businesses lag behind the technology curve by adopting the technology on the tail end of the bell curve. Of course, the late corners do not gain the same strategic advantage afforded to the early embracing businesses, but do not incur the same costs as implementing infancy technologies as those users that embrace the technology early in its deployment. This cost can often include acceptance, bugs, and total cost to develop. In any event, a majority of companies do not want to pay the cost of early adoption of technology nor do they want to lag technologically. These businesses usually lie somewhere within the mainstream and fall somewhere in the middle of the technology curve.

Consultants and companies, for example, are often looking for quick approach to assess where a company lies on the technology curve to help them determine when a new technology adoption should occur and/or what new technology should be adopted. However, evaluation of the adoption of new technologies, if performed at all, is performed as a manual process today. For example, expert assessors may perform a manual heuristic evaluation of technology adoption. Moreover, these manual assessments tend to be ad hoc and unstructured, especially when trying to determine when new and/or incremental technology curves will occur.

Accordingly, there exists a need in the art to overcome the deficiencies and limitations described herein above.

SUMMARY

In a first aspect of the invention, a method is implemented in a computer infrastructure having computer executable code tangibly embodied on a computer readable storage medium having programming instructions. The programming instructions are operable to at least one of receive and assess current technology adoption trends. Additionally, the programming instructions are operable to provide a technology adoption forecast.

In another aspect of the invention, a system comprises a technology adoption curve (TAC) tool. The TAC tool is operable to receive current technology adoption trends, assess the current technology adoption trends and provide a technology adoption forecast.

In an additional aspect of the invention, a computer program product comprising a computer usable storage medium having readable program code embodied in the medium is provided. The computer program product includes at least one component operable to at least one of receive and assess current technology adoption trends and provide a technology adoption forecast. The technology adoption forecast comprises one or more technology adoption curves for at least one of related technologies and unrelated technologies and a determination of at least one gap. The determination of the at least one gap comprises at least one of a technology gap and a time gap. The technology gap comprises at least one component to compensate for one or more differences in at least one metric due to adoption of at least one technology and the time gap comprises a period between a current state and a potential future state. The current state comprises one or more currently adopted technologies and the potential future state comprises adoption of one or more technologies.

In a further aspect of the invention, a computer system for at least one of modeling and forecasting technology adoption, the system comprises a CPU, a computer readable memory and a computer readable storage media. Additionally, the system comprises first program instructions to at least one of receive and assess current technology adoption trends. Further, the system comprises second program instructions to provide a technology adoption forecast for transitioning from one or more currently adopted technologies to one or more newly adopted technologies based on the at least one of the received and the assessed current technology adoption trends. The first and second program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
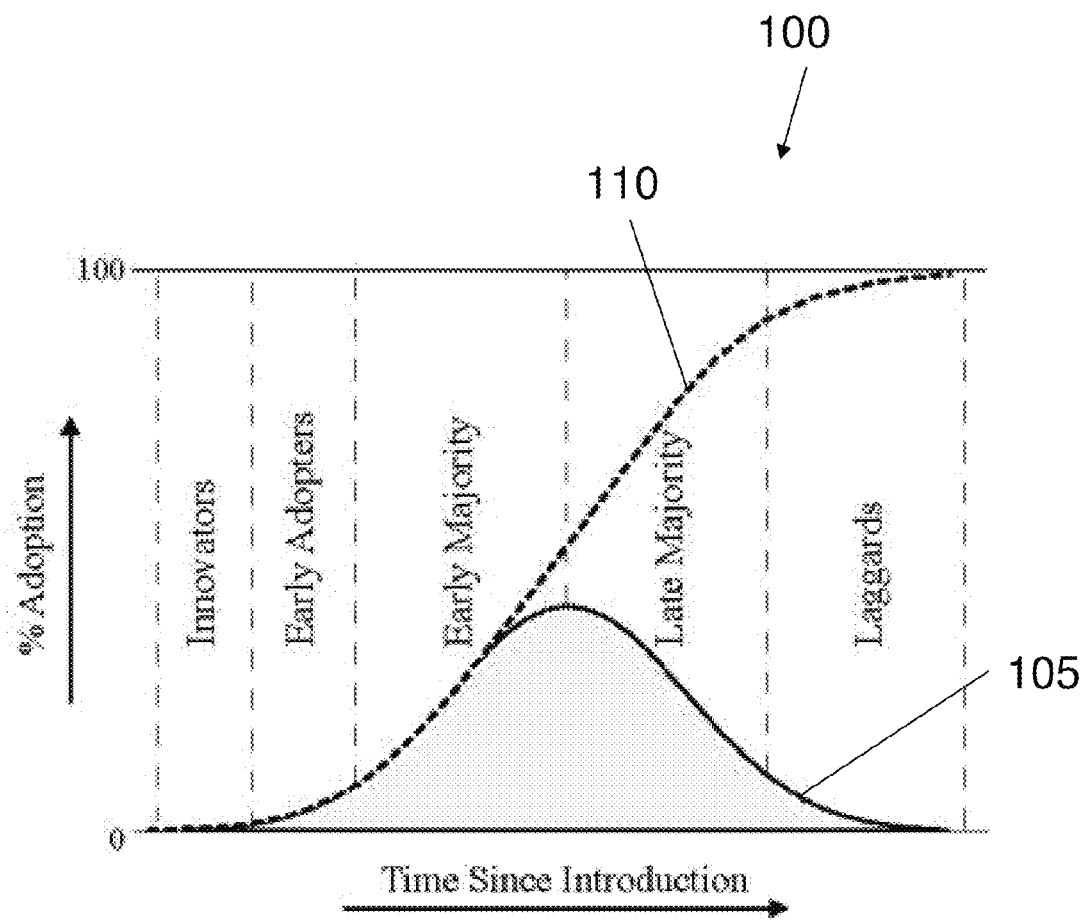
FIG. 1 shows an illustrative technology adoption curve in accordance with aspects of the invention.

The present invention generally relates to technology adoption, and more particularly, to a method and system to model and forecast technology adoption. According to aspects of the invention, the present invention uses an automated system to predict technology adoption assessments. In embodiments, the present invention adds automated and heuristic structure to predictive technology adoption assessments. The automated approach may use statistical data structures and/or computer programs to map an actual adoption to well know technology adoption curves. This approach provides a "curve fit" of real data based upon sample-based assessments that are more rigorous than conventional approaches, e.g., opportunistic and random evaluations. Further, in embodiments, the present invention provides incremental anticipation of likely technology curves.

Currently, there are several maturity assessment tools developed with distinct models for evaluating customer readiness to achieve a specific technology, e.g., Web 2.0. However, maturity assessment studies are expensive and performed on an ad hoc and subjective basis. Moreover, with such maturity assessment studies, technology adoption models are not considered, and the maturity assessment studies are not mapped to a technology adoption methodology. In accordance with aspects of the invention, an adoption model provides a framework for evaluating and predicting technology growth as well as customer and/or competitor adoption.

By implementing the present invention, an organization may predict technology adoption. For example, using the present invention, an organization may efficiently determine when to adopt new technologies and/or which new technologies to adopt. Thus, by implementing the present invention, an organization can determine an ideal point to adopt new technologies, for example, avoiding costs incurred implementing infancy technologies (e.g., as those users that embrace the technology early in its deployment) while avoiding lagging behind the technology curve by adopting the technology on the tail end of the bell curve.

Establish Technology Characteristics

In accordance with aspects of the invention, characteristics (e.g., salient characteristics) of a potential technology, e.g., Web 1.0, are established. In embodiments, the characteristics may include, for example, technology function, user experience (UX), performance, reliability, cost, and/or schedule to implement, amongst other characteristics. In embodiments, determination of characteristics of the technology (or potential technology) may be performed by, for example, an information technology (IT) technician.

In embodiments, the characteristics of the different technologies (e.g., currently implemented and potential technology) can be stored in a storage system, e.g., a database. This information can be retrieved and used in determining, which of such technologies a particular organization should adopt, and when to adopt such technologies, as described below.

Industry Sampling

In accordance with aspects of the invention, industry may be sampled, for example, to set initial benchmarks for adoption of different technologies (e.g., Web 2.0, mobile, cloud computing, etc.). In embodiments, the industry may be sampled to determine actual technology adoption and assess actual adoption relative to the technology characteristics. For example, a service provider may sample technology adoption of, e.g., companies in a particular industry (e.g., insurance industry) to understand when each of these sampled companies adopted (if at all) a particular technology. In embodiments, this sampling data may be stored in a storage system, e.g., a database. Moreover, in embodiments, the sampling data may be categorized according to technology and/or industry. This categorization allows a user to review the sampling data to determine, e.g., adoption trends for particular technologies and/or adoption trends for particular industries. Moreover, as described further below, by establishing a database of technology adoption, the present invention is able to provide forecast curves of technology adoption.

Technology Adoption Modeling

In accordance with aspects of the invention, using the database of technology adoption, the present invention is operable to establish technology adoption curves (e.g., for a particular technology and/or a particular industry). FIG. 1 illustrates a graph of a general technology adoption curve 100 indicating a percentage of adoption of a technology (e.g., a graphical user interface (GUI)) as time passes. Additionally, FIG. 1 illustrates a cumulative adoption curve 110, indicating the cumulative adoption of the technology.

As shown in FIG. 1, the general technology adoption curve 105 follows a standard bell curve with a minority of businesses embracing technology in its earlier stages while another minority only reluctantly embraces such technology when it is mature. Said otherwise, a minority of businesses lag behind the technology curve by adopting the technology on the tail end of the bell curve.

Figure 2:
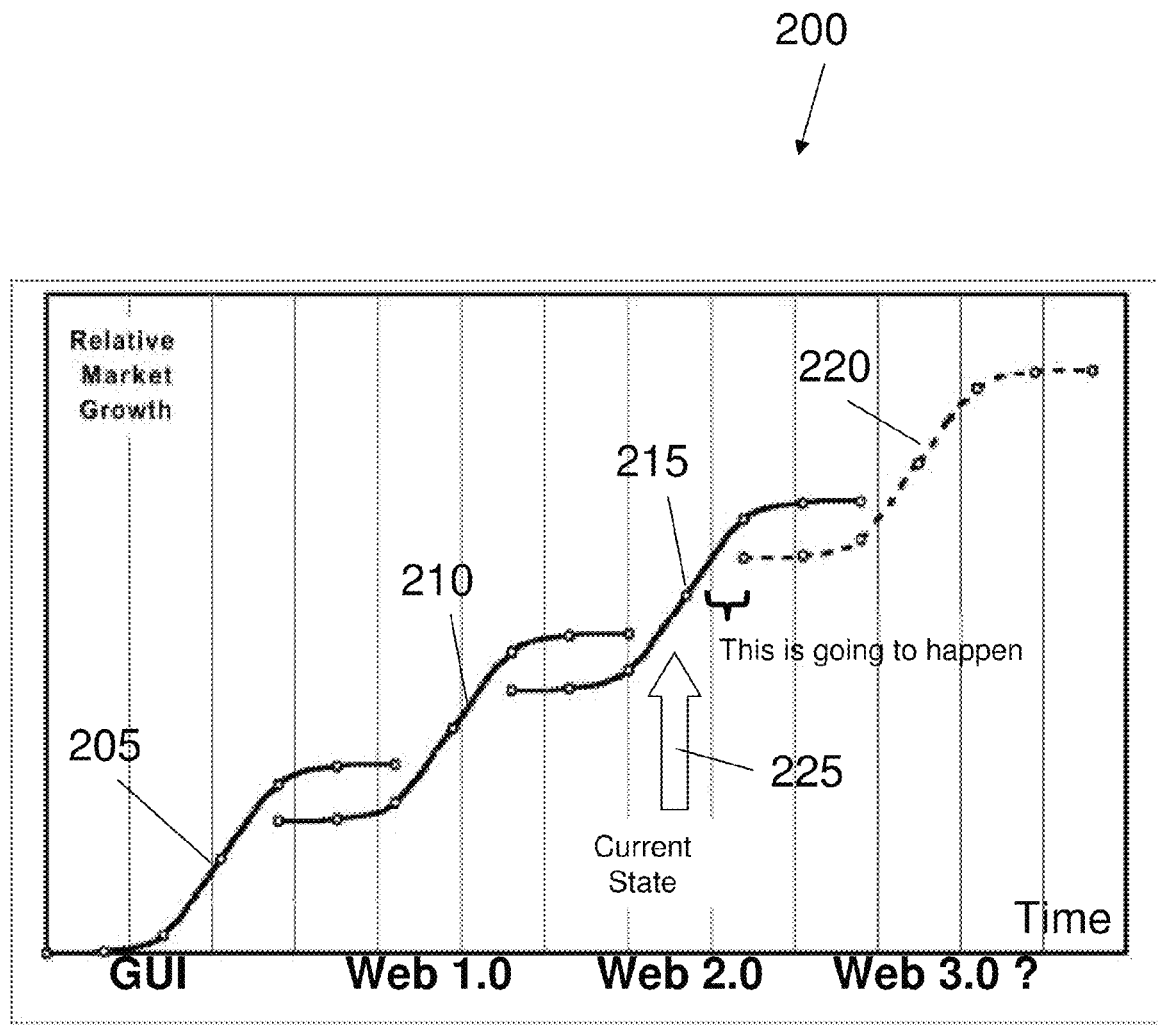
FIGS. 2-6 show exemplary technology adoption curves in accordance with aspects of the invention.

FIG. 2 illustrates an exemplary graph 200 of a plurality of technology adoption curves and a forecast curve for different, but related technologies, indicating relative market growth of each of the related technologies over time in accordance with aspects of the invention. As described below, in embodiments, the present invention is operable to establish technology adoption curves using the above-described database of technology adoption. More specifically, graph 200 includes a GUI technology adoption curve 205, a Web 1.0 technology adoption curve 210 and a Web 2.0 technology adoption curve 215. Additionally, graph 200 includes a Web 3.0 forecast curve 220. It should be noted that these technology adoption curves 205, 210 and 215 (and forecast curve 220) only illustrate the front end of their respective bell curves. Moreover, as these technologies may build on each other, FIG. 2 illustrates a continuous growth from one adopted technology to a subsequently adopted technology. While the example of FIG. 2 illustrates certain technologies (e.g., GUI, Web 1.0, Web 2.0 and Web 3.0), the invention contemplates that any other technology may also be used with the present invention.

The passage from the early stages of the GUI technology through Web 1.0 and Web 2.0 technology represent, for example, an evolution and adoption of newer technologies in a field of related technologies. For example, a graphical user interface (GUI) is a type of user interface item that allows people to interact with programs in more ways than typing. That is, a GUI offers graphical icons, and visual indicators, as opposed to text-based interfaces, typed command labels or text navigation to fully represent the information and actions available to a user. The actions are usually performed through direct manipulation of the graphical elements.

Web 1.0 technology represents an advance over the GUI technology. Web 1.0 refers to the state of the World Wide Web, and any website design style used before the advent of the Web 2.0 phenomenon. Web 2.0 refers to applications that facilitate interactive information sharing, interoperability, user-centered design and collaboration on the World Wide Web. Examples of Web 2.0 include web-based communities, hosted services, web applications, social-networking sites, video-sharing sites, wikis, blogs, mashups and folksonomies. A Web 2.0 site allows its users to interact with other users or to change website content, in contrast to non-interactive websites where users are limited to the passive viewing of information that is provided to them.

As illustrated in FIG. 2, relative market growth of the GUI (indicated by GUI technology adoption curve 205) increases, e.g., towards the top of the bell curve (only half of which is illustrated in FIG. 2). However, as shown in FIG. 2, towards the top of the GUI technology adoption curve 205, relative market growth of Web 1.0 begins (indicated by Web 1.0 technology adoption curve 210). Likewise, towards the top of the Web 1.0 technology adoption curve 210, relative market growth of Web 2.0 begins (indicated by Web 2.0 technology adoption curve 215). Furthermore, while the exemplary graph 200 of FIG. 2 does not illustrate actual time on the x-axis, in embodiments, the present invention is operable to indicate an actual time frame on the x-axis to provide a temporal reference, e.g., for a particular organization.

Additionally, in accordance with aspects of the invention, the exemplary graph 200 includes the Web 3.0 technology adoption forecast curve 220. As shown in FIG. 2, the exemplary graph 200 indicates a jump from Web 2.0 technology to Web 3.0 technology will occur at some proximate future date. Web 3.0 is the next step in the evolution of the Internet and Web applications. Web 3.0 is a web in which data is linked to allow for more meaningful, actionable insight to be extracted. Web 3.0 involves semantic web (or the meaning of data), personalization, intelligent search and behavioral advertising among other features. In essence, Web 3.0 (or the semantic Web) will allow machines to "read" Web pages much as humans read them, and will provide a place where search engines and software agents can better troll the Web and find what is sought. The emergence of a new era of technologies, collectively known as Web 3.0, provides a strategically significant opportunity, for example, to make media and business run better.

The present invention is operable to determine the Web 3.0 technology adoption forecast curve 220 based on the sampled technology adoption data, for example, for technologies in related fields (e.g., GUI, Web 1.0 and/or Web 2.0) and any available sampling data relating to actual adoption of Web 3.0 technology. In accordance with aspects of the invention, in embodiments, the present invention is operable to automate sampling and integration of related technology adoption curves to forecast when (and at what rate) a future adoption of a new technology may occur. It should be understood that, in embodiments, the entire Web 3.0 technology adoption forecast curve 220 may be a forecast or a portion of the Web 3.0 technology adoption forecast curve 220 may be a forecast. That is, for example, while Web 3.0 technology adoption forecast curve 220 is shown in FIG. 2 as a forecast (as indicated by the dashed line), the invention contemplates that some portion of the Web 3.0 technology adoption forecast curve 220 may be quantifiable, for example, if some companies (e.g., innovators and/or early adopters) have begun to adopt such technologies.

For example, in embodiments, the present invention may determine a forecast curve (e.g., the Web 3.0 technology adoption forecast curve 220) based on the rate of adoption (e.g., a slope) of earlier related technologies (e.g., GUI, Web 1.0 and/or Web 2.0). Moreover, the present invention may determine a forecast curve (e.g., the Web 3.0 technology adoption forecast curve 220) based on the relative offsets of adjacent technology adoption curves (e.g., the offset of Web 1.0 technology adoption curve 210 relative to the Web 2.0 technology adoption curve 215).

As shown in FIG. 2, the exemplary graph 200 also indicates a current state arrow 225, which indicates an organization's current state with regard to the technologies shown in the exemplary graph 200. In embodiments, the present invention is operable to receive an indication of an organization's (e.g., a company's) current state of technology adoption. Furthermore, the present invention is operable to provide a graphical depiction of the organization's current state of technology adoption relative the technology adoption curve(s). Thus, with the example of FIG. 2, an organization has adopted Web 2.0 technology (e.g., as an early adopter).

Figure 3:
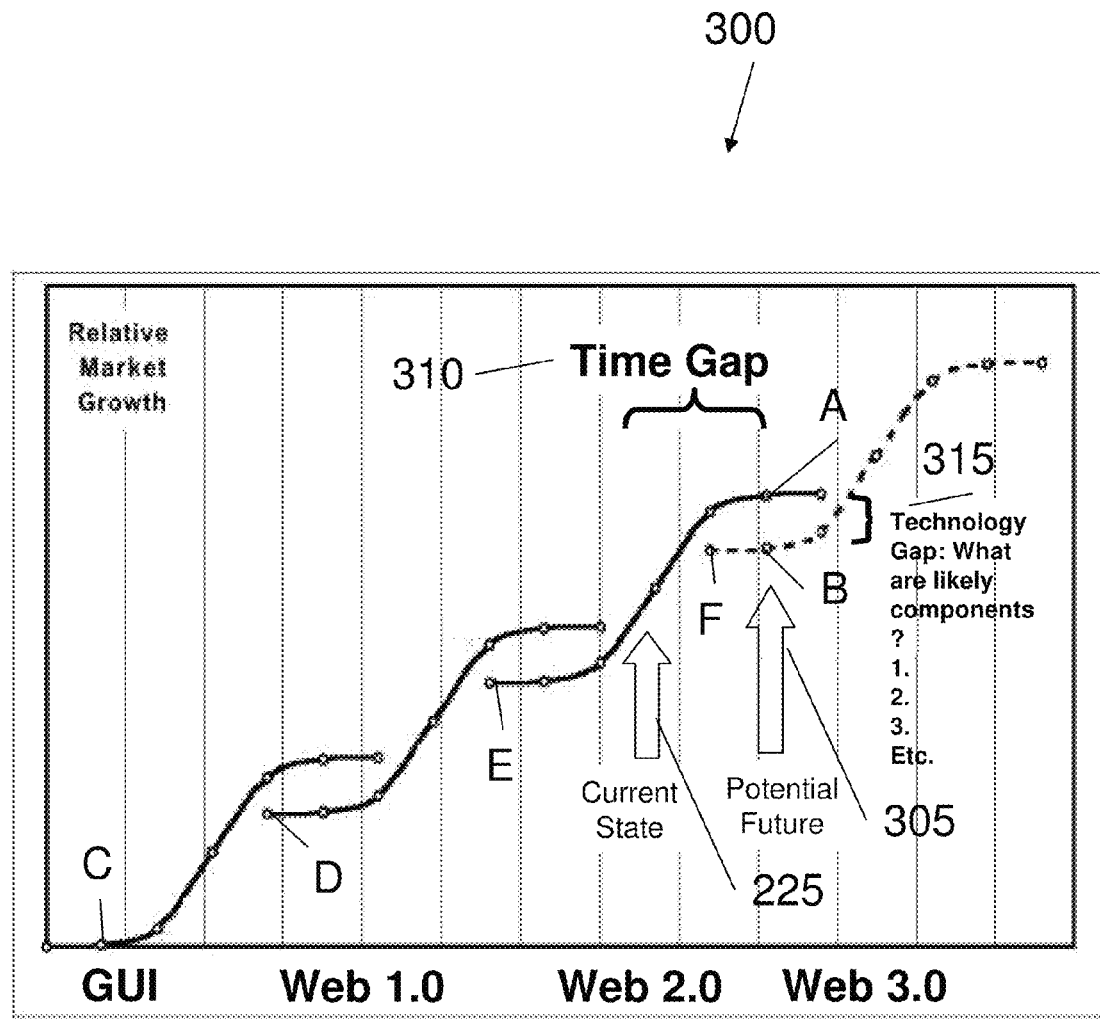

In embodiments, the present invention is operable to integrate technology adoption curves for predecessor, follow-on technologies, and potentially new technologies. FIG. 3 illustrates an exemplary graph 300 in accordance with aspects of the invention, which includes the plurality of technology adoption curves and a forecast curve for different, but related technologies shown in FIG. 2. Additionally, FIG. 3 includes a potential future indicator 305, spaced from the current state 225 by a time gap 310. The potential future indicator 305 illustrates that a particular organization who possesses Web 2.0 technology (as indicated by the current state indicator 225) may either decide to remain using the Web 2.0 technology (e.g., at point "A"), i.e., not adopt the new technology, or may adopt the Web 3.0 technology (e.g., at point "B").

Additionally, as shown in FIG. 3, there exists a technology gap 315 between point "A" and point "B." That is, with the example of FIG. 3, as the Web 3.0 technology may be in early stages of development at the potential future 305, were an organization to adopt Web 3.0 technology at potential future 305, such an organization may experience a technology gap 315 between the current abilities of Web 3.0 and the abilities of their previously utilized Web 2.0 technologies. That is, the early capabilities of a subsequent technology may not be as good as the current capabilities of the currently adopted technology. A technology gap 315 may include, for example, gaps in response time, storage limits, training, functionality and/or usability, amongst other technology gaps. In accordance with aspects of the invention, by understanding any technology gaps that may be experienced in transitioning from a currently adopted technology to a new technology, an organization will be presented with more information with which to make an adoption decision. Moreover, by visualizing the technology gap(s), an organization will be empowered to identify likely components of the "technology adoption stack," e.g., components necessary to account for such gaps.

As Web 3.0 technology experiences greater adoption, the abilities and/or functionality of Web 3.0 should improve; whereas Web 2.0, which may be near its peak of adoption, may experience a flattening of abilities and/or functionality. Thus, generally, with a shorter time gap between a current state and a potential future, an organization may experience a greater technology gap.

In embodiments, the present invention is operable to assess technology gaps as they change dynamically over time (e.g., as increasing numbers of organizations begin adopting a new technology and/or as the new technology matures such that technology gaps are reduced and/or eliminated). Moreover, the present invention is operable to store the assessments of technology gaps in a storage system, e.g., a database. In embodiments, such stored assessments of technology gaps may be used for modeling of future technology gaps.

In embodiments, in accordance with additional aspects of the invention, the present invention is operable to assess the time gaps between, for example, onsets and/or any other stage of adoption (e.g., early adoption stage) of follow-on technologies (e.g., between points "C" and "D" and/or "D" and "E") and utilize the assessment of historical time gaps to predict the onset of new technologies (e.g., the time gap between points "E" and "F"). Moreover, the present invention is operable to store the assessments of time gaps in a storage system, e.g., a database.

Integration of "Unrelated" Technology Adoption Curves

Figure 4:
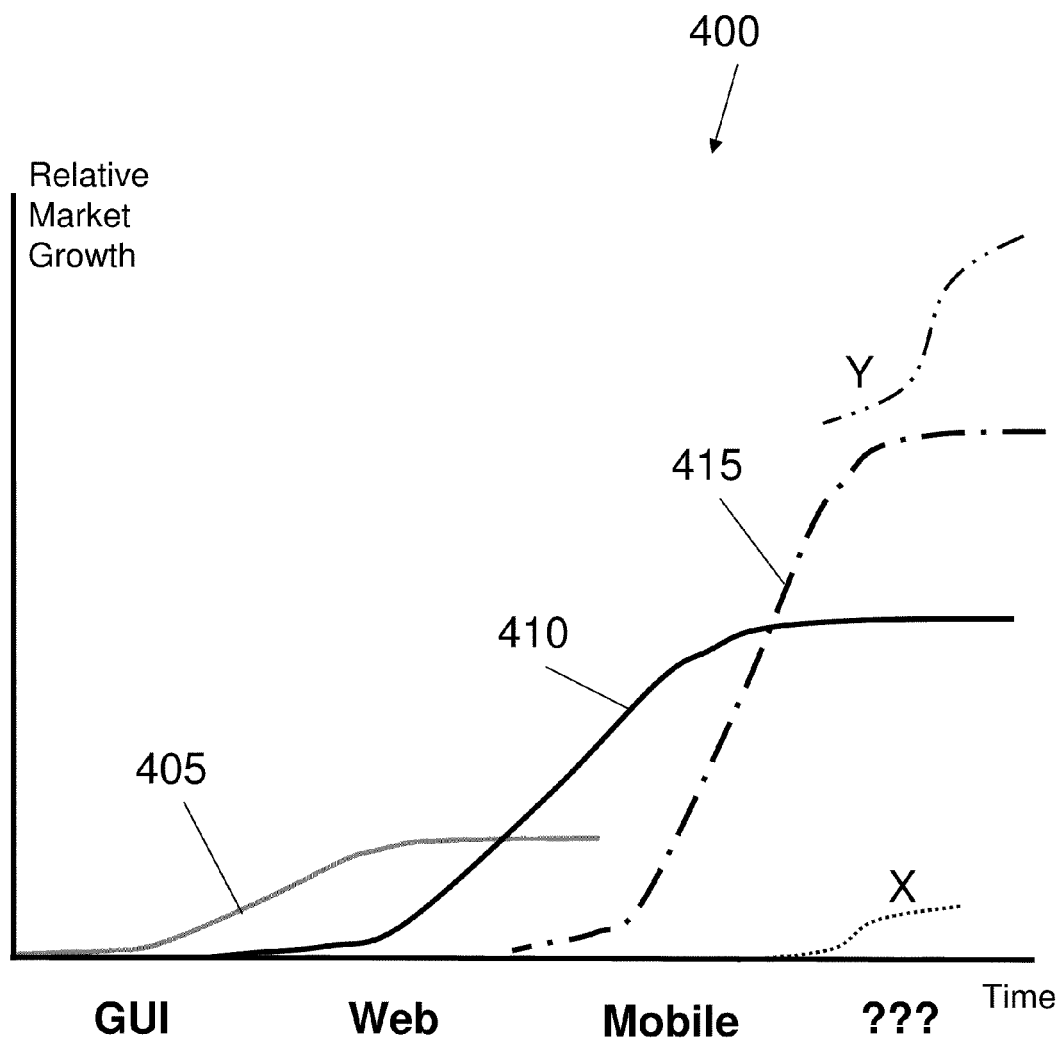

FIG. 4 illustrates an exemplary graph 400 showing an integration of adoption curves for multiple technologies that are potentially integratable. That is, FIG. 4 illustrates adoption curves for some related technologies plotted along with some seemingly unrelated technologies. More specifically, graph 400 includes a GUI technology adoption curve 405 and a Web technology adoption curve 410, which as discussed above, may be considered related technologies. Additionally, exemplary graph 400 includes a mobile technology adoption curve 415, "X" technology adoption curve, and "Y" technology adoption curve. For example, the "X" technology adoption curve may be for cloud computing technology and the "Y" technology adoption curve may be for robotics technology. Moreover, cloud computing and/or robotics technology may be seemingly unrelated to the GUI technology, the Web technology and/or the mobile technology.

In accordance with aspects of the invention, the present invention is operable to integrate seemingly unrelated technology adoption curves to analyze potentially new and integratable technologies, for example, for potential leapfrog or break through innovation (e.g., in people, process, assets and/or tools). By integrating adoption curves of seemingly unrelated technology, e.g., as shown in FIG. 4, the present invention is operable to provide a user with additional information with which to make technology adoption determinations. That is, using this additional information comprising, e.g., a graphical depiction of integrated adoption curves for seemingly unrelated technology, for example, an organization may determine that by opting to adopt both the mobile technology and the seemingly unrelated cloud computing technology, the organization will experience potential leapfrog or break through innovations. Additionally, by integrating seemingly unrelated technology adoption curves to analyze potentially new and integratable technologies, the present invention supports analysis of what technology components may be likely to spur the next adoption curve, e.g., components that would add to a Web 2.0 technology curve. While FIG. 4 illustrates certain technology adoption curves, it should be understood that the invention contemplates adoption curves for any technologies.

Technology Adoption Quantification

Figure 5:
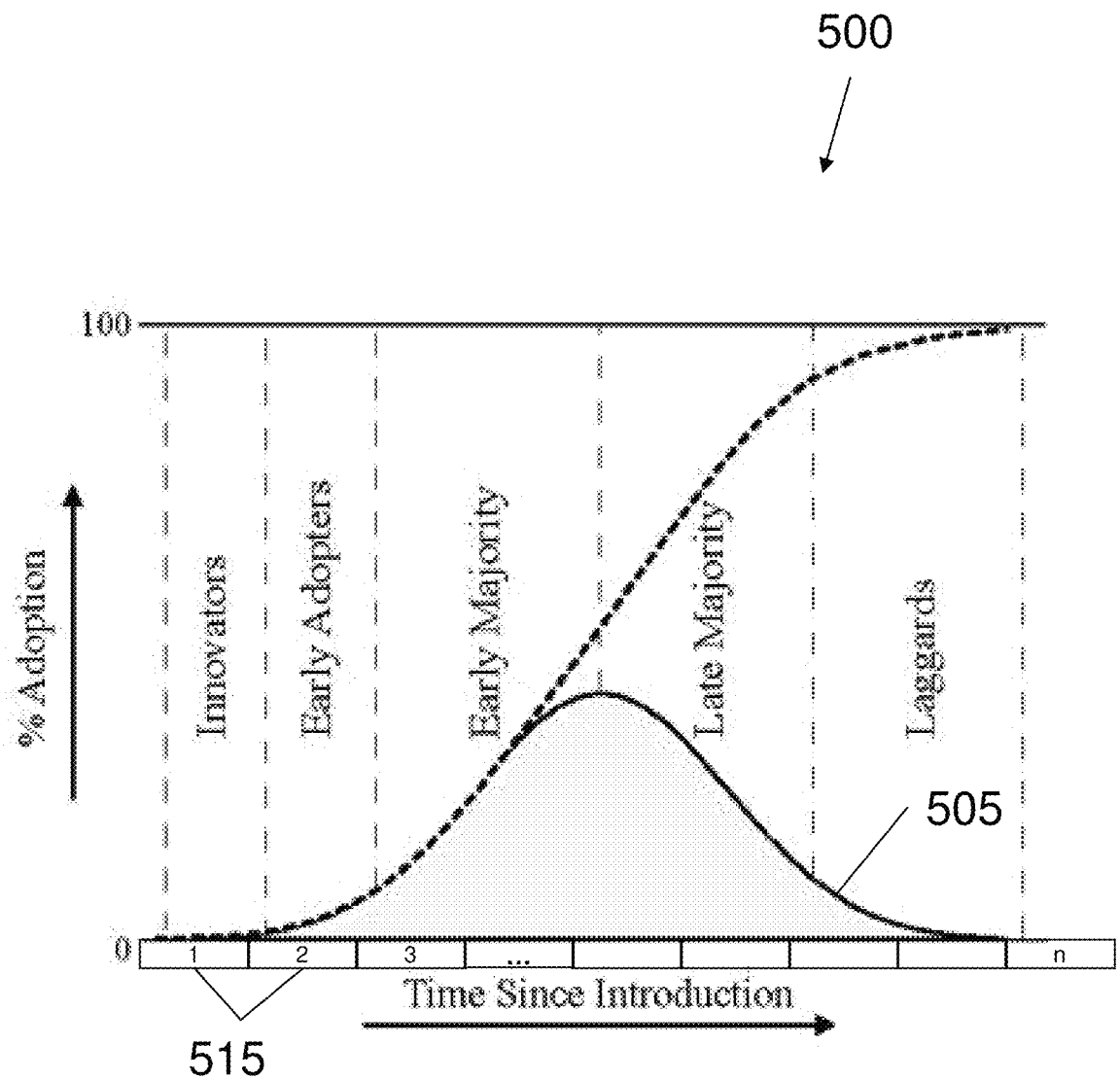

FIG. 5 illustrates an exemplary graph 500 of adoption curve 505 similar to the graph of technology adoption curve graph 100 shown in FIG. 1 and described above. Additionally, FIG. 5 includes increments 515 (e.g., increments 1–n). For example, a technology may be composed of many capabilities achieved in increments (or steps) over time (e.g., weeks, months, years, etc.). Each increment 515 may represent an incremental change in one or more aspects, such as, for example, technology function, user experience (UX), performance, reliability, cost, and/or schedule to implement, amongst other aspects of the adopted technology (e.g., improvements in user experience and/or reductions in cost). For example, as adoption of a given technology proceeds, the technology may evolve, grow, and/or improve over time.

In embodiments, the present invention is operable to quantify aspects of a technology adoption in increments 515. For example, the present invention is operable to quantify technology function, user experience (UX), performance, reliability, cost, and/or schedule to implement for each of the increments 515 for a given technology. Fully adopted technologies and partially adopted technologies may be quantified to provide predictive aspects of a technology adoption. That is, a quantification of the aspects of a fully (or largely) adopted technology may be used to determine predictive aspects of a new technology.

For example, the present invention is operable to quantify costs incurred for adopting a technology (e.g., Web 1.0) at different increments 515 along the time since introduction. Such a quantification may indicate that organizations that adopted the technology earlier (e.g., innovators or early adopters) did so at a higher cost than those organizations that adopted the technology later (e.g., late majority). Moreover, such a quantification may indicate the relative cost incurred by adoption of the technology by increment. For example, the quantification may indicate that during increment one, an adopter may incur a cost of X, whereas during increment n−1, an adopter may incur a cost of X/10. That is, an adoption of technology during increment n−1 may incur one-tenth of the cost incurred when adopting that technology at increment one. These quantified aspects may be stored in a storage system (e.g., a database) and may be accessed by the present invention.

By establishing quantifications for the aspects of different technologies, the present invention may utilize these quantifications in predicting, for example, changes in cost, for adoption of new technologies for the increments. Moreover, the present invention may utilize these quantifications in predicting technology gaps experienced during the different increments. For example, by quantifying technology function, user experience (UX), performance, reliability and/or schedule to implement during the increments for different technologies (e.g., related and/or unrelated technologies), the present invention is operable to determine technology gaps (e.g., lower user experience) that may be encountered when adopting a particular technology. That is, different technologies may experience similar rates of change in technology function, user experience (UX), performance, reliability, cost, and/or schedule to implement as they are adopted. Thus, the present invention is operable to quantify such aspects for the adoption of different technologies in order to predict such aspects for a particular technology adoption.

As should be understood, the present invention contemplates that the adoption curve may be segmented into any number of increments. While a greater number of increments may increase data collection and/or data retention, with a greater number of increments may provide more accurate quantifications of the technology aspects. Conversely, while a lower number of increments may reduce data collection and/or retention, a lower number of increments may provide less precise quantifications of the technology aspects. Moreover, it should be understood that different technology aspects (e.g., technology function, user experience (UX), performance, reliability, cost, and/or schedule to implement) may be quantified using different increments.

Figure 6:
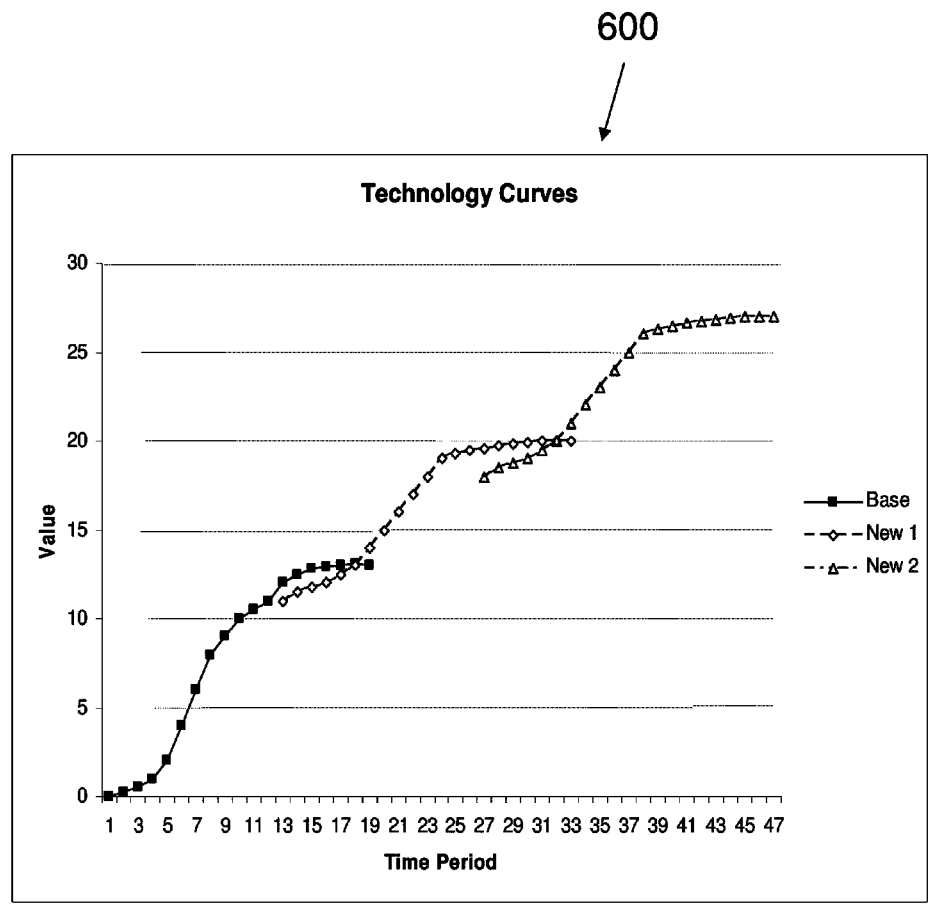

FIG. 6 illustrates an exemplary technology adoption curve graph 600 showing adoption curves for an incremental set of technologies (e.g., "base," "New 1" and "New 2") in accordance with aspects of the invention. In embodiments, the present invention may utilize a matrix, for example, with columns for each technology (e.g., "base," "New 1" and "New 2") under evaluation and rows for time periods (e.g., "1"-"47"), or increments. In embodiments, a user, e.g., a technology adoption analyst, may define data points based on an estimation of adoption. For example, each data point may comprise an estimate of percentage of adoption based upon heuristic estimates of implementation of a series of technology steps over time. Additionally, the matrix may quantify, e.g., capability (function and UX), usability, performance, reliability, cost, amongst other aspects of the technologies for each time period for each technology. In embodiments, the estimates may be modeled using high level distribution curves, e.g., cumulative normal, beta, etc.

In embodiments, additional columns may be used to map actual adoption versus predictive adoption. Furthermore, additional refinements may be added to data, such as, statistical sampling, for example, incorporate additional variables to, e.g., translate the impact of a new technology into economic impacts (e.g., costs). Such variables may include economy impacts, financial statements and corporate investment profiles, amongst other variables. In further embodiments, data mining for key factors and customer driven input, e.g., engagements, questionnaires, and surveys, may be incorporated. The present invention is further operable to estimate business value of differences between, for example, one technology adoption curve and the next, e.g., based on the technology aspects (e.g., technology function, user experience (UX), performance, reliability, cost, and/or schedule to implement).

Figure 7:
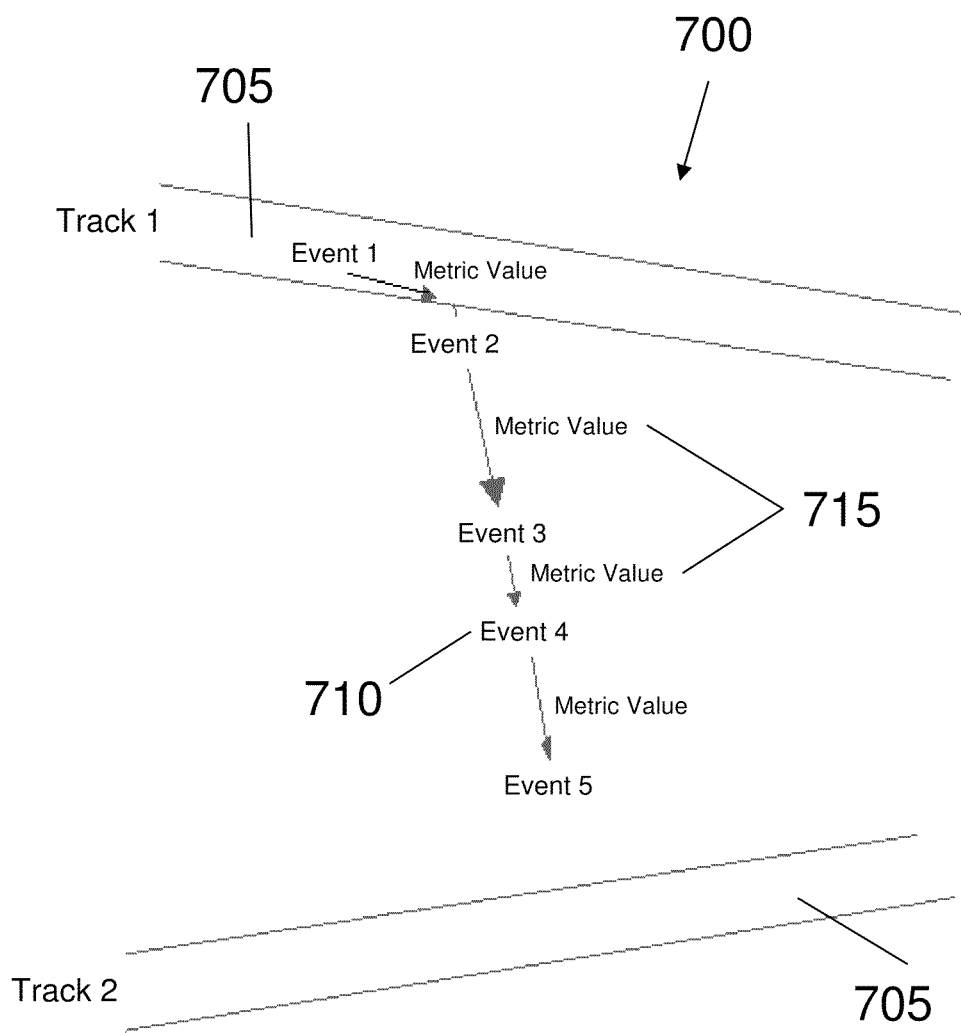
FIGS. 7 and 8 show exemplary tire track diagrams in accordance with aspects of the invention.

FIG. 7 illustrates an exemplary tire tracks diagram 700 in accordance with aspects of the present invention. In embodiments, the present invention may provide tire tracks diagrams to provide drilldown techniques for tracking events and performance of a technology's characteristics. For example, tire tracks diagrams, such as the exemplary tire tracks diagram 700, may be used to assess how a track 705 (e.g., "Track 1") and/or events 710 (e.g., "Event 1") flow and link to other events (e.g., "Event 2," "Event 3," "Event 4," and/or "Event 5") and/or tracks (e.g., "Track 2"). The present invention may assess metrics, which may include, for example, technology function, user experience (UX), performance, reliability, cost, and/or schedule to implement, to determine one or more metric values 715 for transitions between different events 710 (e.g., a previously adopted technology and a currently adopted technology). The metrics may be used to assess and/or predict technology gaps and/or the adoption of new technologies. In embodiments, the present invention is operable to store such metrics, e.g., metric values 715, in a storage system, e.g., a database, and predict future events and/or metrics associated with such future events using the previously assessed metrics. For example, in embodiments, the present invention is operable to serve as a predictive aid by determining the potential for an intersection of one event (e.g., the adoption of a technology) with another event (e.g., the adoption of another technology).

Figure 8:
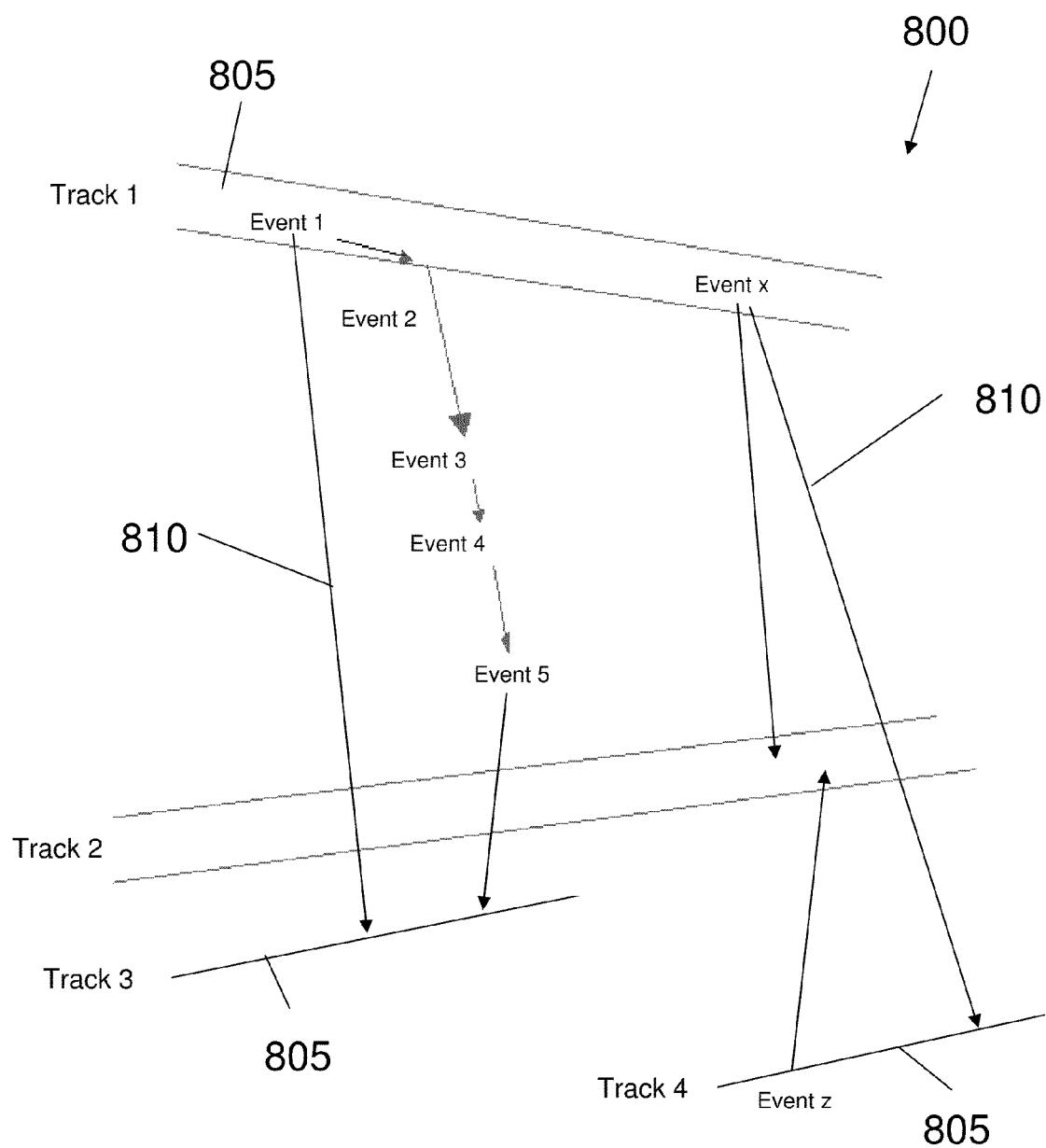

FIG. 8 illustrates an exemplary tire tracks (or N-tracks) diagram 800. As shown in FIG. 8, exemplary tire tracks diagram 800 indicates relations 810 between adoption of different technologies 805 (e.g., timesharing, graphics, the Internet, graphical user interfaces (GUIs), World Wide Web, etc.). The present invention may use tire tracks diagrams to assess how the adoption of multiple technologies and tools intersect, link and/or integrate (e.g., a rearview mirror approach). Additionally, present invention may use tire tracks diagrams to predict (or illustrate such predictions of) how the adoption of multiple technologies and tools may intersect, link and/or integrate. In embodiments, the present invention may use one or metrics (e.g., technology function, user experience (UX), performance, reliability, cost, and/or schedule to implement) to evaluate performance, e.g., time, percent of adoption, cost and/or resource. Additionally, in embodiments, the present invention may automate integration of seemingly unrelated tire track diagrams and/or technology adoption curves.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 9:
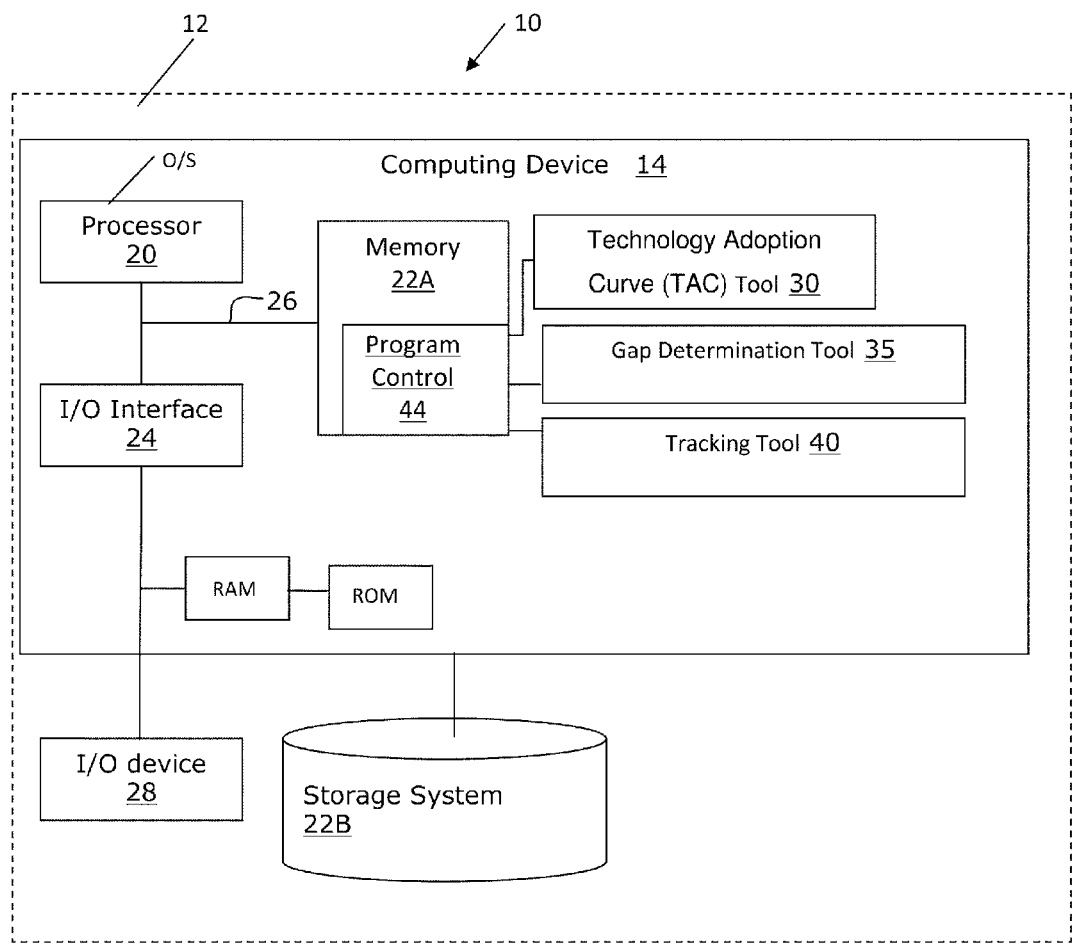
FIG. 9 shows an illustrative environment for implementing the steps in accordance with aspects of the invention.

FIG. 9 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a technology adoption curve (TAC) tool 30, a gap determination tool 35 and a tracking tool 40. The TAC tool 30, the gap determination tool 35 and the tracking tool 40 can be implemented as one or more program code in the program control 44 stored in memory 22A as separate or combined modules. Additionally, the TAC tool 30, the gap determination tool 35 and the tracking tool 40 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The technology adoption curve (TAC) tool 30 is operable to create, integrate and/or display multiple technology adoption curves and/or predict new technology adoption curves, for example, as illustrated in FIGS. 2-4, e.g., the processes described herein. For example, the TAC tool 30 is operable to determine a technology adoption forecast curve for a particular technology based on the sampled technology adoption data, for example, for technologies in related fields and any available sampling data relating to actual adoption of the particular technology. In accordance with aspects of the invention, industry may be sampled, for example, to set initial benchmarks for adoption of different technologies (e.g., Web 2.0, mobile, cloud computing, etc.). In embodiments, the industry may be sampled to determine actual technology adoption and assess actual adoption relative to the technology characteristics. For example, a service provider may sample technology adoption of, e.g., companies in a particular industry (e.g., insurance industry) to understand when each of these sampled companies adopted (if at all) a particular technology. In embodiments, this sampling data may be stored in a storage system, e.g., a database, for example, storage system 22B of FIG. 9. Moreover, in embodiments, the sampling data may be categorized according to technology and/or industry. This categorization allows a user to review the sampling data to determine, e.g., adoption trends for particular technologies and/or adoption trends for particular industries. In embodiments, a user, e.g., a technology adoption analyst, may define data points based on an estimation of adoption.

Moreover, by establishing a database of technology adoption, the TAC tool 30 is able to provide forecast curves of technology adoption. For example, in embodiments, the TAC tool 30 may determine a forecast curve for a particular technology based on the rate of adoption (e.g., a slope) of earlier related technologies. Moreover, the TAC tool 30 may determine a forecast curve relative to other related technologies based on the relative offsets of adjacent related technology adoption curves (e.g., the offset of Web 1.0 technology adoption curve 210 relative to the Web 2.0 technology adoption curve 215). Additionally, the TAC tool 30 is operable to display a list of available technology adoption models and receive a user selection of one or more technology adoption models. The TAC tool 30 is further operable to obtain and display one or more selected technology adoption curve models.

The gap determination tool 35 is operable to provide user experience mechanisms to predict future technology adoption curves and gaps (e.g., technology and/or time gaps) and identify likely future technology components, for example, as illustrated in FIGS. 3-6, e.g., the processes described herein. For example, the characteristics information of the different technologies (e.g., currently implemented and potential technology) can be stored in a storage system, e.g., a database, for example, storage system 22B. The gap determination tool 35 is operable to retrieve this information and utilize the information in determining which of such technologies a particular organization should adopt, and when to adopt such technologies, as described below. The gap determination tool 35 provides an understanding of any technology gaps that may be experienced in transitioning from a currently adopted technology to a new technology, such that an organization will be presented with more information with which to make an adoption decision. Moreover, by providing a visualization of the technology gap(s), the gap determination tool 35 empowers an organization to identify likely components of the "technology adoption stack," e.g., components necessary to account for such gaps.

Additionally, the gap determination tool 35 is operable to assess technology gaps as they change dynamically over time (e.g., as increasing numbers of organizations begin adopting a new technology and/or as the new technology matures such that technology gaps are reduced and/or eliminated). The gap determination tool 35 is also operable to store the assessments of technology gaps in a storage system, e.g., a database, for example, storage system 22B. In embodiments, the gap determination tool 35 may utilize such stored assessments of technology gaps for modeling of future technology gaps. For example, the gap determination tool 35 is operable to quantify costs incurred for adopting a technology (e.g., Web 1.0) at different increments along the time line since introduction. Such a quantification may indicate that organizations that adopted the technology earlier (e.g., innovators or early adopters) did so at a higher cost than those organizations that adopted the technology later (e.g., late majority). Moreover, such a quantification may indicate the relative cost incurred by adoption of the technology by increment. For example, the quantification may indicate that during increment one, an adopter may incur a cost of X, whereas during increment n−1, an adopter may incur a cost of X/10. That is, an adoption of technology during increment n−1 may incur one-tenth of the cost incurred when adopting that technology at increment one. In embodiments, the gap determination tool 35 may model estimates using high level distribution curves, e.g., cumulative normal, beta, etc. These quantified aspects may be stored in a storage system (e.g., a database), for example, storage system 22B, and may be accessed by the gap determination tool 35.

By establishing quantifications for the aspects of different technologies, the gap determination tool 35 may utilize these quantifications in predicting, for example, changes in cost, for adoption of new technologies for the increments. Moreover, the gap determination tool 35 may utilize these quantifications in predicting technology gaps experienced during the different increments. For example, by quantifying technology function, user experience (UX), performance, reliability and/or schedule to implement during the increments for different technologies (e.g., related and/or unrelated technologies), the present invention is operable to determine technology gaps (e.g., lower user experience) that may be encountered when adopting a particular technology. That is, different technologies may experience similar rates of change in technology function, user experience (UX), performance, reliability, cost, and/or schedule to implement as they are adopted. Thus, the present invention is operable to quantify such aspects for the adoption of different technologies in order to predict such aspects for a particular technology adoption.

The tracking tool 40 is operable to provide user experience mechanisms to track individual technology tracks, events, metrics, and performance, for example, as illustrated in FIGS. 7 and 8, e.g., the processes described herein.

Flow Diagram

Figure 10:
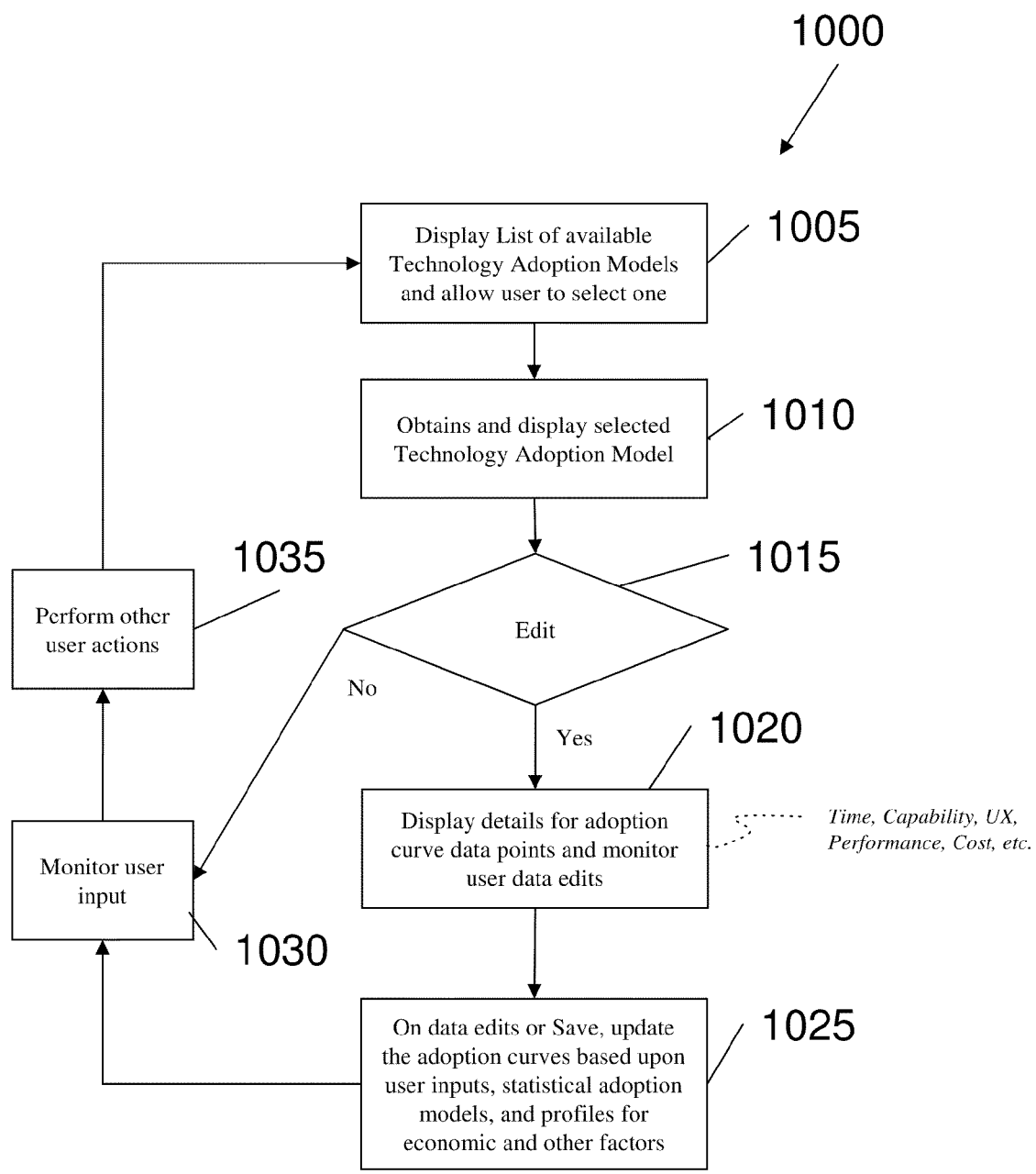
FIG. 10 shows an exemplary flow in accordance with aspects of the invention.

FIG. 10 shows an exemplary flow for performing aspects of the present invention. The steps of FIG. 10 may be implemented in the environment of FIG. 9, for example. The flow diagram may equally represent a high-level block diagram or a swim-lane diagram of the invention. The flowchart and/or block diagram in FIG. 10 illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 9. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 10 depicts an exemplary flow 1000 for a process in accordance with aspects of the present invention. More specifically, exemplary flow 1000 illustrates a process for selecting and/or modifying a technology adoption curve. As shown in FIG. 10, at step 1005 the TAC tool displays a list of available technology adoption models and receives a user selection of one or more technology adoption curve models. In embodiments, the available technology adoption models may be categorized, e.g., by domain of interest and/or technologies). At step 1010 the TAC tool obtains and displays one or more selected technology adoption models from a database, e.g., storage system 22B of FIG. 9. At step 1015, the TAC tool receives a determination of whether to edit the displayed technology adoption curve. If, at step 1015, a user opts to not edit the displayed technology adoption curve, the process proceeds to step 1030.

If, at step 1015, a user opts to edit the displayed technology adoption curve, the process proceeds to step 1020. At step 1020, the TAC tool displays details for adoption curve data points (e.g., technology function, user experience (UX), performance, reliability, cost, and/or schedule to implement) and monitors user data edits. For example, the displayed technology adoption curve may be adjusted to change a number of adopters of a new technology and/or to flatten (or stretch) a technology adoption curve, e.g., to account for economic fluctuations. At step 1025, the TAC tool saves data edits and updates the adoption curves based upon user inputs, statistical adoption models, and profiles for economic and other factors. At step 1030, the TAC tool monitors user inputs, which may include, for example, view selections for selecting different views of the technology adoption curve, amongst other user inputs. At step 1035, the TAC tool perform other user actions, such as, selecting a new technology adoption curve model, and the process may optionally proceed to step 1005 (as indicated by the dashed line).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   store characteristics for earlier technologies that have already been adopted;
   store sampling data comprising data relating to actual technology adoption of the earlier technologies, and data relating to an assessment of the actual technology adoption of the earlier technologies relative to the stored characteristics for the earlier technologies;
   receive and assess current technology adoption trends for the earlier technologies based on the stored characteristics and sampling data for the earlier technologies, wherein the assessment of the current technology adoption trends comprises analyzing a difference between a technology adoption forecast curve associated with the stored characteristics of the earlier technologies and an actual user experience associated with the actual technology adoption of the earlier technologies; and
   provide a new technology adoption forecast curve for a new technology that has not been adopted based on the assessment of the current technology adoption trends for the earlier technologies; and
   determine a user experience for adopting the new technology over the earlier technology using the new technology adoption forecast curve, wherein the user experience changes between an introduction of the new technology and the adoption of the new technology,
   wherein the providing the new technology adoption forecast curve comprises: determining the new technology adoption forecast curve based on a rate of adoption of the earlier technologies or a relative offset of adoption curves for at least two of the earlier technologies;
   determine a time gap between a current technological state of an organization and a potential future technological state of the organization, wherein the potential future technological state indicates a time when the organization may either decide to remain using at least one of the earlier technologies or adopt the new technology; and
   determine at least one technology gap at a specified time between the at least one of the earlier technologies being used by the organization and the new technology,
   wherein the technology gap indicates a gap between capabilities of the at least one of the earlier technologies and the new technology.

2. The method of claim 1, wherein the technology gap comprises at least one component to compensate for one or more differences in at least one metric due to adoption of at least one technology.

3. The method of claim 2, wherein the at least metric comprises at least one of a technology function, a user experience (UX), a performance, a reliability, a cost, and a schedule to implement.

4. The method of claim 1, wherein the current technological state comprises one or more currently adopted technologies and the potential future technological state comprises adoption of one or more technologies.

5. The method of claim 1, wherein the assessing the current technology adoption trends comprises at least one of a determination and a tracking of one or more differences in at least one metric due to adoption of at least one technology.

6. The method of claim 5, wherein the at least one of the determination and the tracking of the one or more differences in the at least one metric comprises at least one of:

assessing the one or more differences for at least one time increment; and utilizing at least one tire track diagram.

7. The method of claim 1, wherein a service provider at least one of creates, maintains, deploys and supports the computer infrastructure.

8. The method of claim 1, wherein the steps of claim 1 are provided by a service provider on a subscription, advertising, and/or fee basis.

9. The method of claim 1, wherein the programming instructions are further operable to:
determine and assess at least one additional technology gap between at least one of the earlier technologies and an onset of a follow-on technology as the at least one additional technology gap changes over time; and
predict an onset of the new technology based on the at least one additional technology gap.

10. The method of claim 9, wherein:
the stored characteristics for the earlier technologies comprise at least one of technology function, performance, reliability, cost, and schedule to implement; and
the programming instructions are further operable to:
provide increments for the current technology adoption trends, wherein each increment represents an incremental change in at least one of the characteristics for the earlier technologies;
quantify the at least one of the characteristics for the earlier technologies for each increment; and
use the quantification of the at least one of the characteristics to provide the technology adoption forecast for the new technology.

11. The method of claim 10, wherein:
the programming instructions are further operable to store characteristics for the new technology;
the sampling data further comprises any data relating to the actual technology adoption of the new technology and any data relating to an assessment of the actual technology adoption of the new technology relative to the stored characteristics for the new technology;
the programming instructions are further operable to provide the technology adoption forecast curve for the new technology based on the assessment of the current technology adoption trends for the earlier technologies and the stored characteristics and sampling data for the new technology; and
the programming instructions are further operable to use the quantification of the at least one of the characteristics to determine the at least one technology gap at the specified time between the at least one of the earlier technologies being used by the organization and the new technology.

12. The method of claim 10, wherein the quantification associated with the cost indicates that a greater value of the cost is associated with early adoption of the earlier technologies.

13. The method of claim 10, wherein the quantification associated with performance indicates that the performance improves with a late adoption of the earlier technologies.

14. A system implemented in hardware, comprising:
a technology adoption curve (TAC) tool implemented in a processor and operable to:
store characteristics for earlier technologies that have already been adopted;
store sampling data comprising data relating to actual technology adoption of the earlier technologies, and data relating to an assessment of the actual technology adoption of the earlier technologies relative to the stored characteristics for the earlier technologies;
receive current technology adoption trends for the earlier technologies;
assess the current technology adoption trends based on the stored characteristics and sampling data for the earlier technologies, wherein the assessment of the current technology adoption trends comprises analyzing a difference between a technology adoption forecast curve associated with the stored characteristics of the earlier technologies and an actual user experience associated with the actual technology adoption of the earlier technologies;
provide a new technology adoption forecast curve for a new technology that has not been adopted based on the assessment of the current technology adoption trends for the earlier technologies; and
determine a user experience for adopting the new technology over the earlier technology using the new technology adoption forecast curve, wherein the user experience changes between an introduction of the new technology and the adoption of the new technology,
wherein the providing the new technology adoption forecast curve comprises: determining the new technology adoption forecast curve based on a rate of adoption of the earlier technologies or a relative offset of adoption curves for at least two of the earlier technologies;
determine a time gap between a current technological state of an organization and a potential future technological state of the organization, wherein the potential future technological state indicates a time when the organization may either decide to remain using at least one of the earlier technologies or adopt the new technology; and
determine at least one technology gap at a specified time between the at least one of the earlier technologies being used by the organization and the new technology,
wherein the technology gap indicates a gap between capabilities of the at least one of the earlier technologies and the new technology.

15. The system of claim 14, further comprising a tracking tool operable to at least one of determine and track of one or more differences in at least one metric due to adoption of at least one technology, wherein the at least metric comprises at least one of a technology function, the user experience (UX), a performance, a reliability, a cost, and a schedule to implement.

16. A computer program product comprising a computer usable storage hardware medium having readable program code embodied in the storage hardware medium, the computer program product includes at least one component operable to:
receive and assess current technology adoption trends for earlier technologies based on stored characteristics and sampling data for the earlier technologies, wherein the assessment of the current technology adoption trends comprises analyzing a difference between a technology adoption forecast curve associated with the stored characteristics of the earlier technologies and an actual user experience associated with the actual technology adoption of the earlier technologies; and
provide a new technology adoption forecast comprising:
a curve for a new technology that has not been adopted based on the assessment of the current technology adoption trends for the earlier technologies;
a determination of a time gap, wherein the time gap represents a period between a current state of technology and a potential future state of technology, wherein the current state represents a current technology state with respect to at least one of the earlier technologies and the potential future state represents a future technology state with respect to the new technology; and a determination of a technology gap, wherein the technology gap represents a difference between current capabilities of at least one of the earlier technologies and early capabilities of the new technology, wherein the technology gap is determined based on stored assessments technology gaps.

17. A computer system for at least one of modeling and forecasting technology adoption, the system comprising:

a CPU, a computer readable memory and a computer readable storage media;

first program instructions to store characteristics for one or more earlier technologies that have already been adopted and one or more new technologies that have not been adopted;

second program instructions to store sampling data comprising data relating to actual technology adoption of the one or more earlier technologies, any data relating to actual technology adoption of the one or more new technologies, data relating to an assessment of the actual technology adoption of the one or more earlier technologies relative to the stored characteristics for the one or more earlier technologies, and any data relating to an assessment of the actual technology adoption of the one or more new technologies relative to the stored characteristics for the one or more new technologies;

third program instructions to receive and assess one or more current technology adoption trends for the one or more earlier technologies based on the stored characteristics and sampling data for the one or more earlier technologies; and fourth program instructions to provide a new technology adoption forecast curve for transitioning from the one or more earlier adopted technologies to one or more newly adopted technologies based on the received and the assessed one or more current technology adoption trends and the stored characteristics and sampling data for the one or more new technologies, wherein the new technology adoption forecast curve determines a user experience for adopting the new technology over the earlier technology, and the user experience changes with an amount of time that occurs between an introduction of the new technology and the adoption of the new technology, wherein the first through fourth program instructions are stored on the computer readable storage media for execution by the CPU via the computer readable memory.

* * * * *